June 16, 1925.
C. C. FARMER
1,541,933
TRAIN CONTROL DRIVE MECHANISM
Filed March 24, 1922
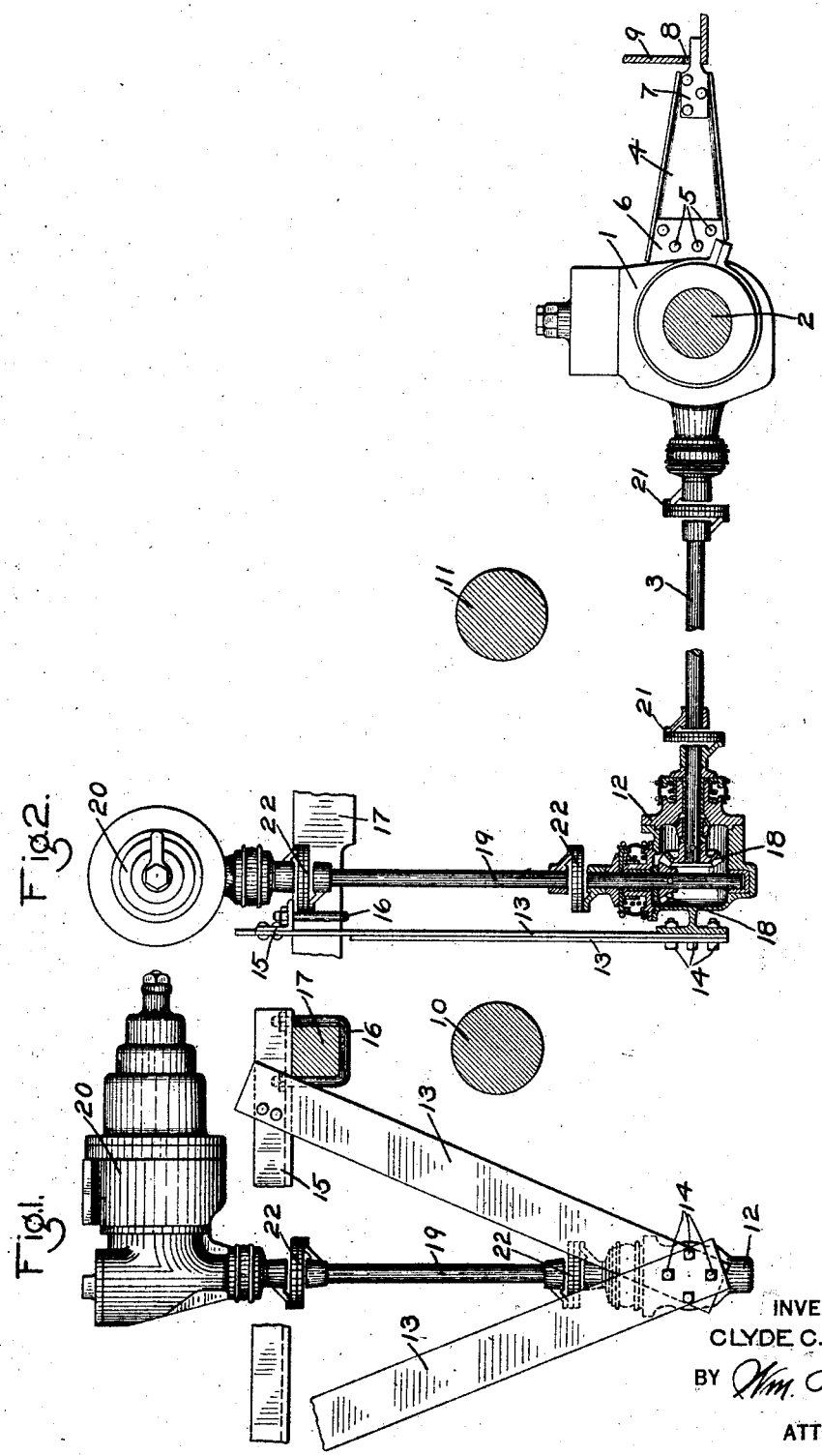
INVENTOR
CLYDE C. FARMER
BY Wm. M. Cady
ATTORNEY Patented June 16, 1925.

1,541,933

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL DRIVE MECHANISM.

Application filed March 24, 1922. Serial No. 546,525.

*To all whom it may concern:*

Be it known that I, CLYDE C. FARMER, a citizen of the United States, residing at Pittsburgh, in the county of Allegheny and State of Pennsylvania, have invented new and useful Improvements in Train-Control Drive Mechanisms, of which the following is a specification.

This invention relates to a drive connecting mechanism more particularly adapted for connecting a driving axle of a locomotive with a speed governor such as employed for controlling an automatic train speed control equipment.

The principal object of my invention is to provide a drive mechanism of the above character having such flexibility as to permit relative movement of the driving axle in any direction with respect to a rigidly mounted speed governor.

In the accompanying drawing; Fig. 1 is a side elevation, partly in section, of a drive mechanism embodying my invention; and Fig. 2 an end elevation thereof.

As shown in the drawing, a gear housing 1 is mounted on the locomotive truck axle 2 and contains gears for driving a shaft 3. The gear housing is prevented from rotating with the axle by providing an arm comprising a channel member 4 secured at one end by bolts 5 to a lug 6 formed as a part of the gear housing 1 and having secured at the other end a finger piece 7 which is adapted to engage in a slot 8 provided in a part of the truck bolster 9 so that rotation is prevented but at the same time free lateral and longitudinal movement of the arm is permitted.

At a point between the locomotive axles 10 and 11, a bevel gear housing 12 is positioned, the housing being flexibly supported by means of thin flexible bar sections 13, secured by bolts 14 at one end to the housing 12 and having the upper ends secured to an angle iron section 15, which may be secured by strap bolts 16 to the engine side frames 17.

The gear housing 12 contains bevel gears 18 for connecting the horizontal drive shaft 3 with a vertical drive shaft 19, the shaft 19 being operatively connected to a speed governor 20 which is rigidly mounted on a suitable support carried by the locomotive framing (not shown). Flexible universal joints 21 are provided in the horizontal drive shaft 3 and similar flexible joints 22 are provided in the vertical drive shaft 19.

By means of the above construction, a large degree of relative movement of the driving axle 2 is made possible without straining any of the parts. The flexible bar supports 13 permit longitudinal movement of the drive mechanism as well as lateral movement by flexing either longitudinally or by a turning or twisting movement. In making curves, the truck axle 2 may be subjected to considerable relative movement, but the above construction provides ample flexibility to permit such movements without unduly stressing the parts.

Having now described my invention, what I claim as new and desire to secure by Letters Patent, is:—

1. In a drive mechanism, the combination with a locomotive truck axle and a gear housing mounted on said axle, of a horizontal drive shaft extending from said housing, a vertical drive shaft, bevel gears for connecting the horizontal drive shaft with the vertical drive shaft, and flexible connections in each shaft.

2. In a drive mechanism, the combination with a locomotive truck axle and a gear housing mounted on said axle, of a horizontal drive shaft extending from said housing, a vertical drive shaft, bevel gears for connecting the horizontal drive shaft with the vertical drive shaft, a gear housing containing said gears, and flexible members for supporting said gear housing.

3. In a drive mechanism, the combination with a locomotive truck axle and a gear housing mounted on said axle, of a horizontal drive shaft extending from said housing, a vertical drive shaft, bevel gears for connecting the horizontal drive shaft with the vertical drive shaft, a gear housing containing said gears, flexible members for supporting said gear housing, and flexible joints in each drive shaft.

4. In a drive mechanism, the combination with a locomotive truck axle and a gear housing mounted on said axle, of an arm carried by said housing and constrained to limit rotative movement of the housing but free to permit lateral and longitudinal movement, a horizontal drive shaft extending from said gear housing, a vertical drive shaft, a gear housing containing gears for operatively connecting said shafts, and flexible members for supporting said gear housing.

5. In a drive mechanism, the combination with a locomotive truck axle and a gear housing mounted on said axle, of an arm carried by said housing and constrained to limit rotative movement of the housing but free to permit lateral and longitudinal movement, a horizontal drive shaft extending from said gear housing, a vertical drive shaft, a gear housing containing gears for operatively connecting said shafts, flexible members for supporting said gear housing, and universal joints in each of the drive shafts.

6. In a mechanical drive mechanism, the combination with a locomotive truck axle, a gear housing mounted on said axle, and a truck bolster element, of an arm carried by said housing and vertically engaging said bolster element to restrict rotative movement of the housing.

In testimony whereof I have hereunto set my hand.

CLYDE C. FARMER.